United States Patent
Cuthbert et al.

(10) Patent No.: US 10,664,665 B2
(45) Date of Patent: *May 26, 2020

(54) TECHNIQUES FOR PROVIDING VISUAL TRANSLATION CARDS INCLUDING CONTEXTUALLY RELEVANT DEFINITIONS AND EXAMPLES

(71) Applicant: Google LLC, Mountain View, CA (US)

(72) Inventors: Alexander Jay Cuthbert, Oakland, CA (US); Barak Turovsky, Mountain View, CA (US)

(73) Assignee: Google LLC, Mountain View, CA (US)

( * ) Notice: Subject to any disclaimer, the term of this patent is extended or adjusted under 35 U.S.C. 154(b) by 138 days.

This patent is subject to a terminal disclaimer.

(21) Appl. No.: 15/852,473

(22) Filed: Dec. 22, 2017

(65) Prior Publication Data

US 2018/0121422 A1    May 3, 2018

Related U.S. Application Data

(63) Continuation of application No. 14/714,439, filed on May 18, 2015, now Pat. No. 9,852,131.

(51) Int. Cl.
*G06F 40/58* (2020.01)
*G06F 16/50* (2019.01)
(Continued)

(52) U.S. Cl.
CPC .............. *G06F 40/58* (2020.01); *G06F 16/50* (2019.01); *G06F 40/242* (2020.01); *G06F 40/40* (2020.01)

(58) Field of Classification Search
CPC .... G06F 17/28; G06F 17/289; G06F 17/2755; G06F 17/241; G06F 16/50; G06F 17/2735; G06F 17/2872; G06F 17/211; G06F 17/276; G06F 17/277; G06F 17/2785; G06F 17/2818; G06F 17/2827; G06F 3/0483; G06F 3/0485; G06F 9/454;
(Continued)

(56) References Cited

U.S. PATENT DOCUMENTS 5,285,386 A    2/1994  Kuo
6,470,306 B1 * 10/2002  Pringle ................. G06F 17/241
                                                            704/3
(Continued)

OTHER PUBLICATIONS

PCT International Search Report and Written Opinion dated Aug. 2, 2016 for PCT International Application No. PCT/US2016/032176, 11 pages.

*Primary Examiner* — Abdelali Serrou
(74) *Attorney, Agent, or Firm* — Fish & Richardson P.C.

(57) ABSTRACT

Computer-implemented techniques can include receiving a selected word in a source language, obtaining one or more parts of speech for the selected word, and for each of the one or more parts-of-speech, obtaining candidate translations of the selected word to a different target language, each candidate translation corresponding to a particular semantic meaning of the selected word. The techniques can include for each semantic meaning of the selected word: obtaining an image corresponding to the semantic meaning of the selected word, and compiling translation information including (i) the semantic meaning, (ii) a corresponding part-of-speech, (iii) the image, and (iv) at least one corresponding candidate translation. The techniques can also include outputting the translation information.

20 Claims, 6 Drawing Sheets

(51) Int. Cl.
*G06F 40/40* (2020.01)
*G06F 40/242* (2020.01)

(58) Field of Classification Search
CPC ............... G06F 16/3337; G06F 16/583; G06F 16/5866; G06F 17/273; G06F 17/274; G06F 17/275; G06F 17/2775; G06F 17/2809; G06F 17/2854; G06F 17/30244; G06F 17/30247; G06F 17/30268; G06F 17/30669; G06F 3/0481; G06F 40/58; G06F 40/242; G06F 40/40; G10L 13/00; G10L 15/26; G10L 15/265; G10L 15/30

See application file for complete search history.

(56) References Cited

U.S. PATENT DOCUMENTS

| | | | |
|---|---|---|---|
| 7,792,785 | B2 | 9/2010 | Clark et al. |
| 8,571,850 | B2 | 10/2013 | Li |
| 9,031,831 | B1 * | 5/2015 | Levchenko .......... G06F 17/2735 |
| | | | 704/9 |
| 9,087,046 | B2 * | 7/2015 | Solntseva .............. G06F 40/40 |
| 9,411,801 | B2 * | 8/2016 | Osipova ............... G06F 17/276 |
| 9,547,644 | B2 * | 1/2017 | Cuthbert ............... G06F 40/47 |
| 9,817,821 | B2 * | 11/2017 | Rylov ..................... G06F 17/28 |
| 2003/0171912 | A1 | 9/2003 | Cabello et al. |
| 2005/0126255 | A1 | 9/2005 | Kojo |
| 2007/0088538 | A1 | 4/2007 | Yang et al. |
| 2008/0221862 | A1 | 9/2008 | Guo |
| 2008/0233980 | A1 * | 9/2008 | Englund ................ G06F 40/58 |
| | | | 455/466 |
| 2009/0076800 | A1 * | 3/2009 | Li ....................... G06F 17/241 |
| | | | 704/10 |
| 2009/0119308 | A1 * | 5/2009 | Clark ...................... G06F 17/28 |
| 2009/0132233 | A1 * | 5/2009 | Etzioni ............... G06F 16/3332 |
| | | | 704/3 |
| 2009/0138454 | A1 * | 5/2009 | Rayner .............. G06F 16/3334 |
| 2010/0057430 | A1 | 3/2010 | Moore-Jones |
| 2010/0204980 | A1 | 8/2010 | Chuiu et al. |
| 2011/0264439 | A1 * | 10/2011 | Sata ................... G06F 17/2827 |
| | | | 704/4 |
| 2012/0036121 | A1 * | 2/2012 | Jitkoff ............... H04M 1/72569 |
| | | | 707/722 |
| 2013/0006954 | A1 | 1/2013 | Nikoulina |
| 2013/0138636 | A1 | 5/2013 | Jin |
| 2013/0149689 | A1 | 6/2013 | DeGross |
| 2013/0173577 | A1 * | 7/2013 | Cheng ................. G06F 16/9537 |
| | | | 707/706 |
| 2013/0211815 | A1 | 8/2013 | Seligman |
| 2013/0227405 | A1 | 8/2013 | Abe |
| 2013/0298141 | A1 * | 11/2013 | Wolfe ..................... G09G 5/14 |
| | | | 719/319 |
| 2013/0305135 | A1 * | 11/2013 | Patterson .............. G06F 3/0483 |
| | | | 715/230 |
| 2014/0081619 | A1 * | 3/2014 | Solntseva ............ G06F 17/289 |
| | | | 704/3 |
| 2014/0081626 | A1 * | 3/2014 | Chang .................... G06F 40/30 |
| | | | 704/9 |
| 2014/0180670 | A1 | 6/2014 | Osipova |
| 2014/0245221 | A1 | 8/2014 | Dougherty |
| 2014/0303958 | A1 * | 10/2014 | Lee ....................... G06F 17/289 |
| | | | 704/2 |
| 2015/0205785 | A1 * | 7/2015 | Beckwith ............. G06F 17/277 |
| | | | 707/738 |
| 2015/0331855 | A1 | 11/2015 | Rylov |
| 2015/0356074 | A1 | 12/2015 | Issaev |
| 2017/0277277 | A1 * | 9/2017 | Li ......................... G06F 3/0237 |

* cited by examiner

TECHNIQUES FOR PROVIDING VISUAL TRANSLATION CARDS INCLUDING CONTEXTUALLY RELEVANT DEFINITIONS AND EXAMPLES

CROSS-REFERENCE TO RELATED APPLICATIONS

This application is a continuation of U.S. patent application Ser. No. 14/714,439, filed May 18, 2015. The entire disclosure of the above application is incorporated herein by reference.

FIELD

The present disclosure generally relates to language translation and, more particularly, to techniques for providing visual translation cards including contextually relevant definitions and examples.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When reading a document in a non-preferred language in a viewing application (a web browser, an e-reader, etc.), a user may periodically come across individual words that the user does not recognize or understand. In these events, the user may select a word in the document to obtain its translation in one of his/her preferred languages. This typically involves cutting and pasting the selected word from the document into a search application or a language translation application. Any contextual information for the selected word is typically lost during this process. Because the selected word lacks any contextual information, the user is presented with a plurality of possible translations of the selected word, many of which may be completely inappropriate for the particular context of use of the word.

SUMMARY

A computer-implemented technique is presented. The technique can include receiving, at a server having one or more processors, a selected word in a source language; obtaining, by the server, one or more parts of speech for the selected word; for each of the one or more parts-of-speech, obtaining, by the server, candidate translations of the selected word to a different target language, each candidate translation corresponding to a particular semantic meaning of the selected word; for each semantic meaning of the selected word: obtaining, by the server, an image corresponding to the semantic meaning of the selected word, and compiling, by the server, translation information including (i) the semantic meaning, (ii) a corresponding part-of-speech, (iii) the image, and (iv) at least one corresponding candidate translation; and outputting, by the server, the translation information.

A computing system having one or more processors is also presented. The computing system can be configured to perform operations comprising: receiving a selected word in a source language; obtaining one or more parts of speech for the selected word; for each of the one or more parts-of-speech, obtaining candidate translations of the selected word to a different target language, each candidate translation corresponding to a particular semantic meaning of the selected word; for each semantic meaning of the selected word: obtaining an image corresponding to the semantic meaning of the selected word, and compiling translation information including (i) the semantic meaning, (ii) a corresponding part-of-speech, (iii) the image, and (iv) at least one corresponding candidate translation; and outputting the translation information.

In some implementations, for each semantic meaning of the selected word, an example sentence in the source language is obtained that includes a form of the selected word, wherein the translation information further includes the example sentence. In some implementations, each example sentence is descriptive of its corresponding image. In some implementations, the selected word is a single word selected by a user from a document in the source language. In some implementations, obtaining the image corresponding to the selected words includes utilizing a machine-trained database of images associated with various semantic meanings.

In some implementations, for each semantic meaning of the selected word, a translation card is generated comprising the translation information, wherein outputting the translation information comprises outputting the translation cards. In some implementations, the selected word is received from a computing device associated with a user and receipt of the translation cards causes the computing device to display at least one of the translation cards. In some implementations, the translation cards are grouped into sets of translation cards, wherein each set of translation cards corresponds to a different part-of-speech, and wherein receipt of the translation cards causes the computing device to display at least one of the translation cards from a particular set of translation cards.

In some implementations, receipt of the translation cards enables the computing device to both (i) transition between different translation cards of the particular set of translation cards, and (ii) transition between different sets of translation cards. In some implementations, receipt of the translation cards enables the computing device to both (i) vertically transition between different translation cards of the particular set of translation cards, and (ii) horizontally transition between different sets of translation cards.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As previously mentioned, conventional language translation techniques involve a user cutting and pasting a selected word from into a search or translation application, thereby losing any contextual information for the selected word. For example, the word "bear" has a plurality of meanings in the English language. The word "bear" in English can mean the animal, which is a noun, as well as a plurality of verb forms: carry, support, and turn or veer (in a direction). These conventional techniques present translations of these forms of the word "bear," typically according to the frequency of use because there is no contextual information. Thus, even though the context of the selected word "bear" is "carry," the user may be provided with a list of translations beginning with translations of the animal/noun form of "bear." The user must then search through all of the potential translations and attempt to discern the context. This process is difficult and time consuming for the user.

Accordingly, techniques are presented for providing visual translation cards including contextually relevant definitions and examples. Each visual translation card may include (i) a semantic meaning of a selected word in a source language, (ii) an image corresponding to the selected word and obtained using its semantic meaning, (iii) a corresponding part-of-speech and (iv) at least one corresponding candidate translation of the selected word to a target language. These techniques provide users the ability to quickly ascertain an appropriate translation of a selected word through the use of images. In some implementations, the visual translation cards can include example sentences having a form of the selected word and that are descriptive of the displayed images, thereby providing contextually relevant, more useful information. A user interface can also provide users the ability to transition between different visual translation cards for a particular part-of-speech (e.g., verbs) and to transition between different visual translation cards for different parts-of-speech (e.g., transition from verb translation cards to noun translation cards).

Figure 1:
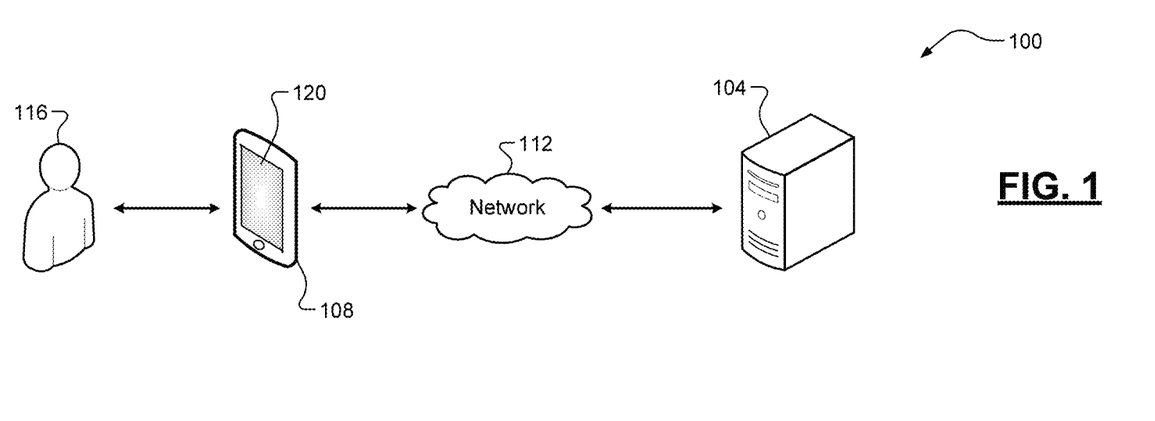
FIG. 1 is a diagram of a computing system including an example server according to some implementations of the present disclosure.

Referring now to FIG. 1, a computing system 100 including an example server 104 is illustrated. The term "server" as used herein can refer to both a single computing device and a plurality of computing devices (e.g., a computing system) operating in a parallel or distributed architecture. The server 104 can communicate with a computing device 108 via a network 112. Examples of the computing device 108 include, but are not limited to, a desktop computer, a laptop computer, a tablet computer, and a mobile phone. The network 112 can include a local area network (LAN), a wide area network (WAN), e.g., the Internet, or a combination thereof. A user 116 can interact with the computing device 108, such as to provide a selected word for translation and to view translation information for the selected word.

Figure 2:
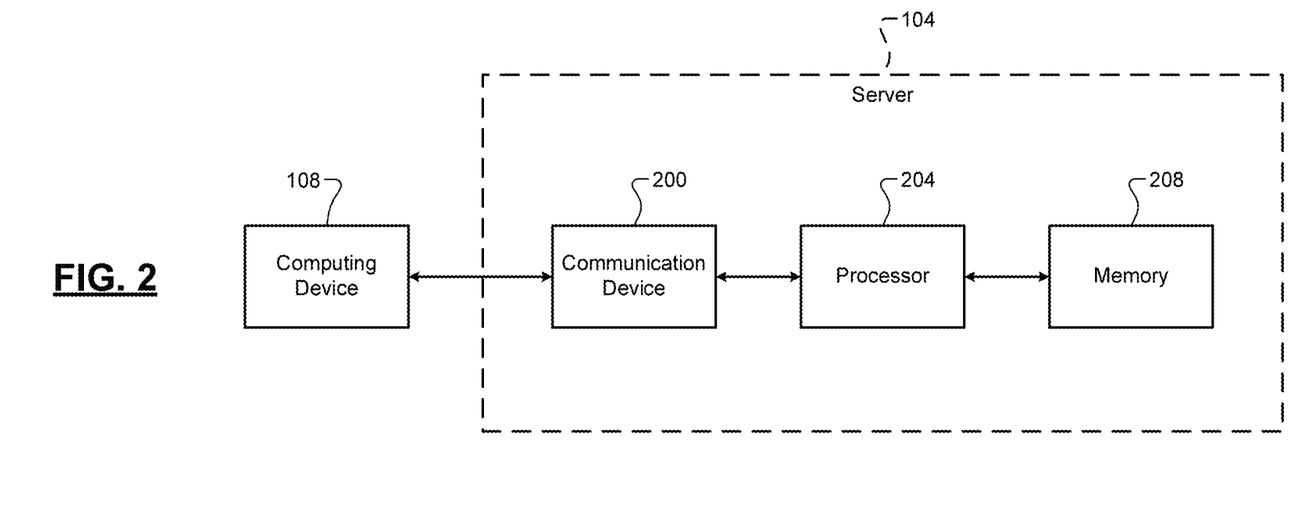
FIG. 2 is a functional block diagram of the example server of FIG. 1.

Referring now to FIG. 2, the example server 104 is illustrated. The server 104 can include a communication device 200, a processor 204, and a memory 208. The communication device 200 can include any suitable components (e.g., a transceiver) configured for communication with the computing device 108. The memory 208 can be any suitable storage medium (flash, hard disk, etc.) configured to store information at the server 104. For example, the memory 208 may store a machine-trained database relating images to various semantic meanings. The processor 204 can control operation of the server 104. Example functions performed by the processor 208 include, but are not limited to, loading/executing an operating system of the computing device 104, controlling communication with other components on the network 112 (e.g., the computing device 108) via the communication device 200, and controlling read/write operations at the memory 208. The term "processor" as used herein can refer to both a single processor and a plurality of processors operating in a parallel or distributed architecture. The processor 204 can also be configured to perform at least a portion of the techniques of the present disclosure, which are now discussed in greater detail.

Figure 3A:
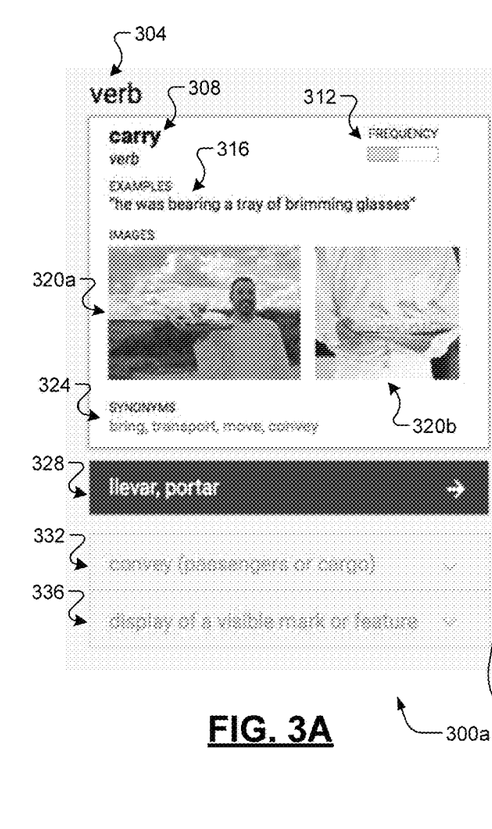
FIGS. 3A-3C illustrate example verb translation cards according to some implementations of the present disclosure.
Figure 3B:
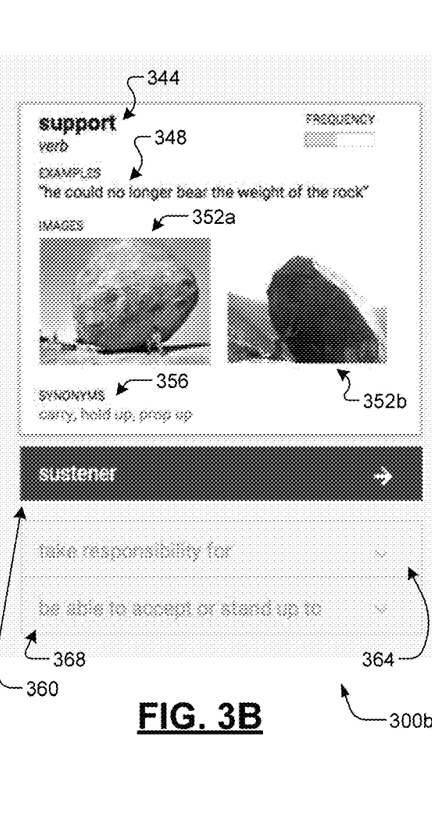
Figure 3C:
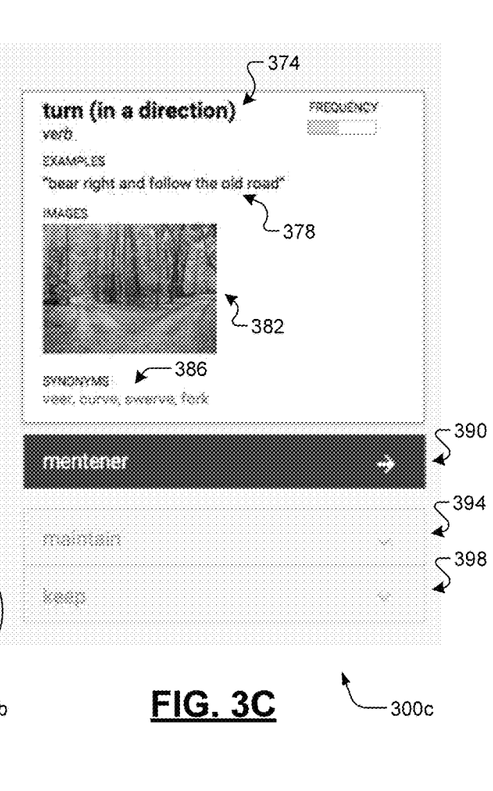

In the example scenario below, the user 116 has selected the word "bear" in the English (source) language used in the context of "to carry" and is looking for a translation of the selected word to the Spanish (target) language. For example, the user 116 may be a native Spanish speaker and is unsure of the meaning of the word "bear" in an English language document, such as a web page. Referring now to FIGS. 3A-3C, example verb translation cards 300*a*, 300*b*, 300*c* ("translation cards 300") are illustrated. A single header 304 is indicative of the part-of-speech for each of the translation cards 300. This configuration having multiple translation cards concurrently displayed could be utilized, for example, when the computing device 108 is a desktop, laptop, or tablet computer having a relatively large display 120.

In FIG. 3A, the translation card 300*a* includes (i) a semantic meaning 308 ("carry") of the selected word ("bear") and, in some implementations, a relative frequency indicator 312 indicative of a frequency of occurrence of the semantic meaning 308. The translation card 300*a* can also include images 320*a*, 320*b* ("images 320") obtained using the semantic meaning 308 and corresponding to the selected word. As shown, each image 320 illustrates a waiter carrying a tray of glasses. These images 320, for example, may be obtained using a machine-trained database relating images to various semantic meanings. The translation card 300*a* can also include an example sentence 316 having a form of the selected word ("bearing") and that is descriptive of the images 320. As shown, the example sentence 316 is "he was bearing a tray of brimming glasses." In some implementations, the translation card 300*a* can further include a list of synonyms 324 for the semantic meaning 308. As shown, the list of synonyms 324 includes bring, transport, move, and convey.

The translation card 300*a* can further include or can otherwise be associated with selectable icons 328, 332, and 336. These selectable icons 328, 332, 336 can be used to cycle between different sub-meanings of the semantic meaning 308. As shown, the word "carry" has three different sub-meanings—to carry an object, to convey passengers or cargo, and to display a visible mark or feature. Each of these sub-meanings can have a different translation in Spanish. The displayed translation card 300*a* is associated with the sub-meaning "to carry an object" and thus selectable icon 328 is highlighted and candidate translations (llevar, portar) are shown. If the user 116 were to select another one of the selectable icons 332 or 336 associated with different sub-meanings, the appearance of the translation card 300*a* would change. More particularly, the example sentence, image(s), list of synonyms, and candidate translation(s) would change to reflect the different sub-meaning.

In FIG. 3B, the translation card 300b is associated with the semantic meaning "support" as shown at 344. Images 352a, 352b ("images 352") illustrate humans supporting the weight of a large rock. An example sentence 348 includes a form of the selected word ("bear") and is descriptive of the images 352 ("he could no longer bear the weight of the rock"). A list of synonyms 356 includes the words carry, hold up, and prop up. A highlighted selectable icon 360 is associated with the sub-meaning "to support an object" and displays the candidate translation "sustener" in Spanish. Other selectable icons 364, 368 are associated with the sub-meanings "to take responsibility for" and "to be able to accept or stand up to."

In FIG. 3C, the translation card 300c is associated with the semantic meaning "turn (in a direction)" as shown at 374. Image 382 illustrates a fork in a path through the woods. An example sentence 378 includes a form of the selected word ("bear") and is descriptive of the image 382 ("bear right and follow the old road"). A list of synonyms 386 includes the words veer, curve, swerve, and fork. A highlighted selectable icon 390 is associated with the sub-meaning "to turn in a direction" and displays the candidate translation "mentener" in Spanish. Other selectable icons 394, 398 are associated with the sub-meanings "to maintain" and "to keep."

Figure 4A:
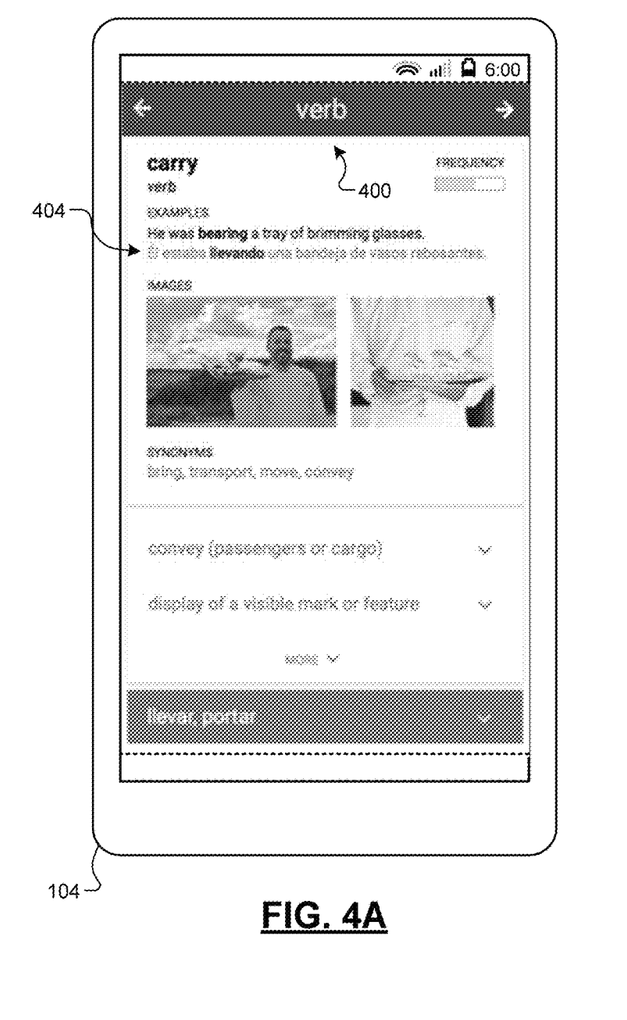
FIGS. 4A-4B illustrate example verb translation cards displayed on a computing device according to some implementations of the present disclosure.
Figure 4B:
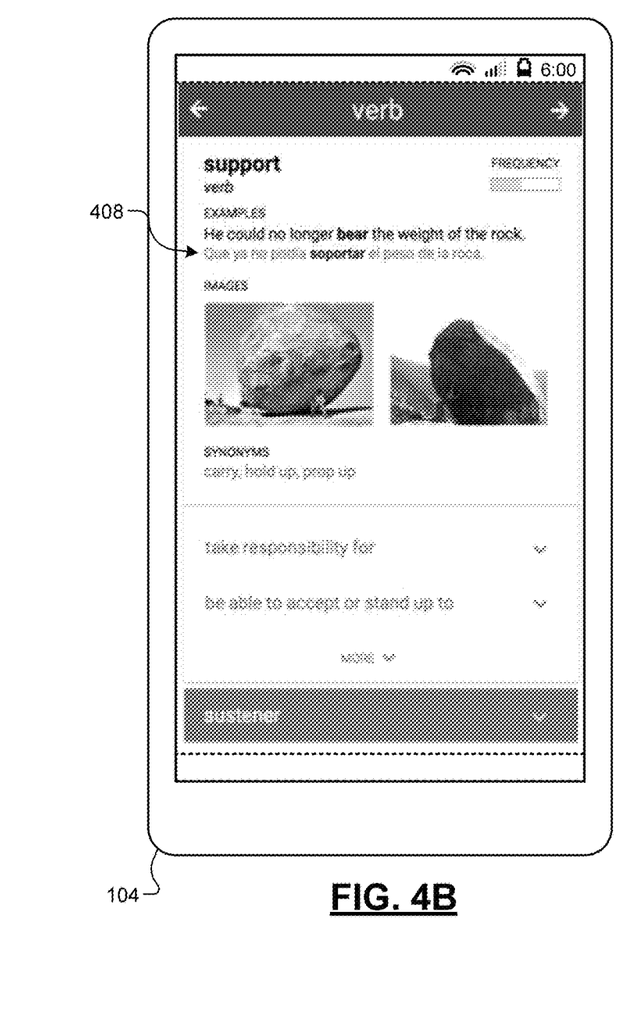

Referring now to FIGS. 4A-4B, single translation card displays are illustrated. This configuration having only a single translation card displayed at a time could be utilized, for example, when the computing device 108 is a mobile phone or tablet computer having a relatively small display 120. A header 400 is indicative of the part-of-speech and the user 116 can horizontally scroll to a different part-of-speech (e.g., from verb to noun). In FIG. 4A, translation card 300a is displayed. In the illustrated example, the translation card 300a can further include a translation 404 of the example sentence 316 to Spanish ("Él estaba llevando una bandeja con copas rebosantes") with the words "bearing" and "llevando" both emphasized. Towards a bottom of the translation card 300a, the user 116 can vertically scroll between the different sub-meanings of the semantic meaning "carry."

In FIG. 4B, translation card 300b is displayed. In the illustrated example, the translation card 300b can further include a translation 408 of the example sentence 348 to Spanish ("Que ya no podia soportar el peso de la roca") with the words "bear" and "soportar" both emphasized. Towards a bottom of the translation card 300b, the user 116 can vertically scroll between the different sub-meanings of the semantic meaning "support."

Figure 5:
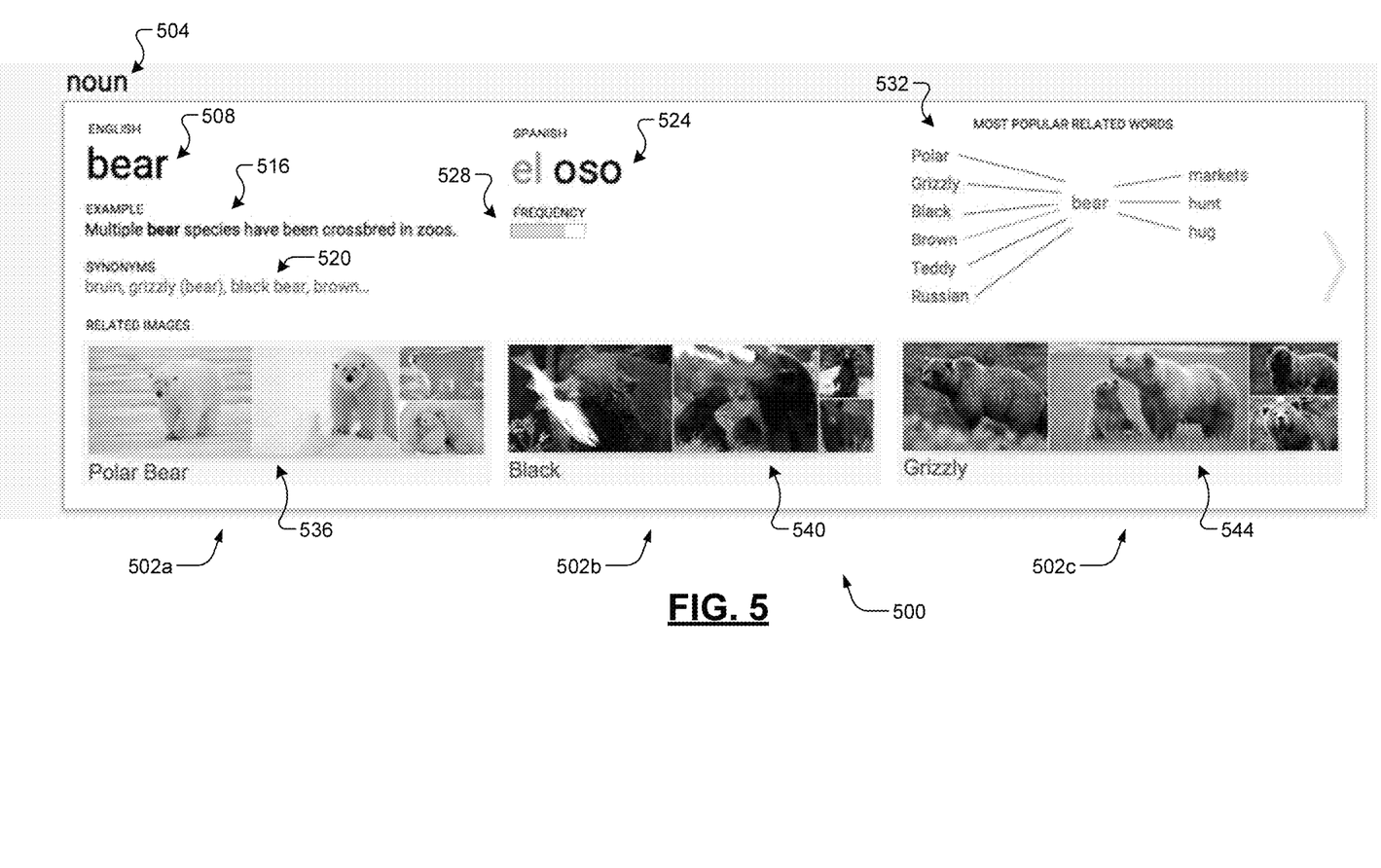
FIG. 5 illustrates an example noun translation card according to some implementations of the present disclosure.

Referring now to FIG. 5, an example noun translation card 500 is illustrated. A single header 504 is indicative of the part-of-speech for the translation card 500. As shown, the translation card 500 includes three portions 502a, 502b, 502c ("portions 502"), each portion 502 displaying different information. This configuration having multiple portions for a single translation card concurrently displayed could be utilized, for example, when the computing device 108 is a desktop, laptop, or tablet computer having a relatively large display 120.

The first portion 502a of the translation card 500 includes a semantic meaning 508 ("bear," the animal) of the selected word ("bear"), an example sentence including a form of the selected word ("bear"), and a list of synonyms 520 (bruin, grizzly (bear), black bear, brown bear, etc.). The second portion 502b of the translation card 500 can include a candidate translation 524 in Spanish ("el oso") and a relative frequency indicator 528. The third portion 502c of the translation card 500 can include a tree 532 of most popular related words to the selected word ("bear"). As shown, these related words include polar, grizzly, black, brown, teddy, and Russian, which are each types of the animal, as well as non-animal related words including markets, hunt, and hug. The translation card 500 can further include one or more images. As shown, the translation card 500 includes three sets of images 536, 540, 544 associated with the first, second, and third portions 502a, 502b, 502c, respectively. The first set of images 536 is of polar bears, the second set of images 540 is of black bears, and the third set of images 544 is of grizzly bears. All of these images, as well as their division into sets, also relates to the example sentence: "Multiple bear species have been crossbred in zoos" (i.e., polar, black, and grizzly are each a species of bear).

Figure 6:
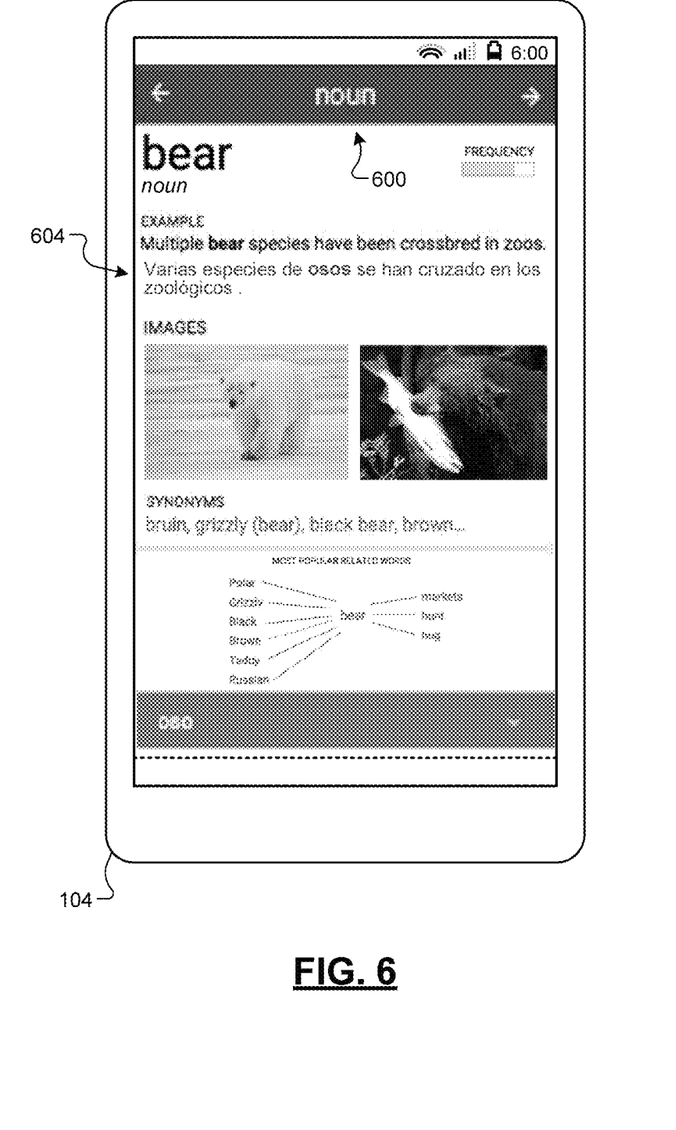
FIG. 6 illustrates an example noun translation card displayed on the computing device according to some implementations of the present disclosure.

Referring now to FIG. 6, a single translation card display is illustrated. This configuration having only a single translation card displayed at a time could be utilized, for example, when the computing device 108 is a mobile phone or tablet computer having a relatively small display 120. A header 600 is indicative of the part-of-speech and the user 116 can horizontally scroll to a different part-of-speech (e.g., from noun to verb). As shown, a portion of the translation card 500 is displayed. In the illustrated example, the translation card 500 can further include a translation 604 of the example sentence 516 to Spanish ("Varias especies de osos se han cruzado en los zoológicos") with the words "bear" and "osos" both emphasized. The displayed portion of the translation card 500 may also include fewer images (e.g., one image of a polar bear and one image of a black bear), but the displayed images still relate to the example sentence 516.

Figure 7:
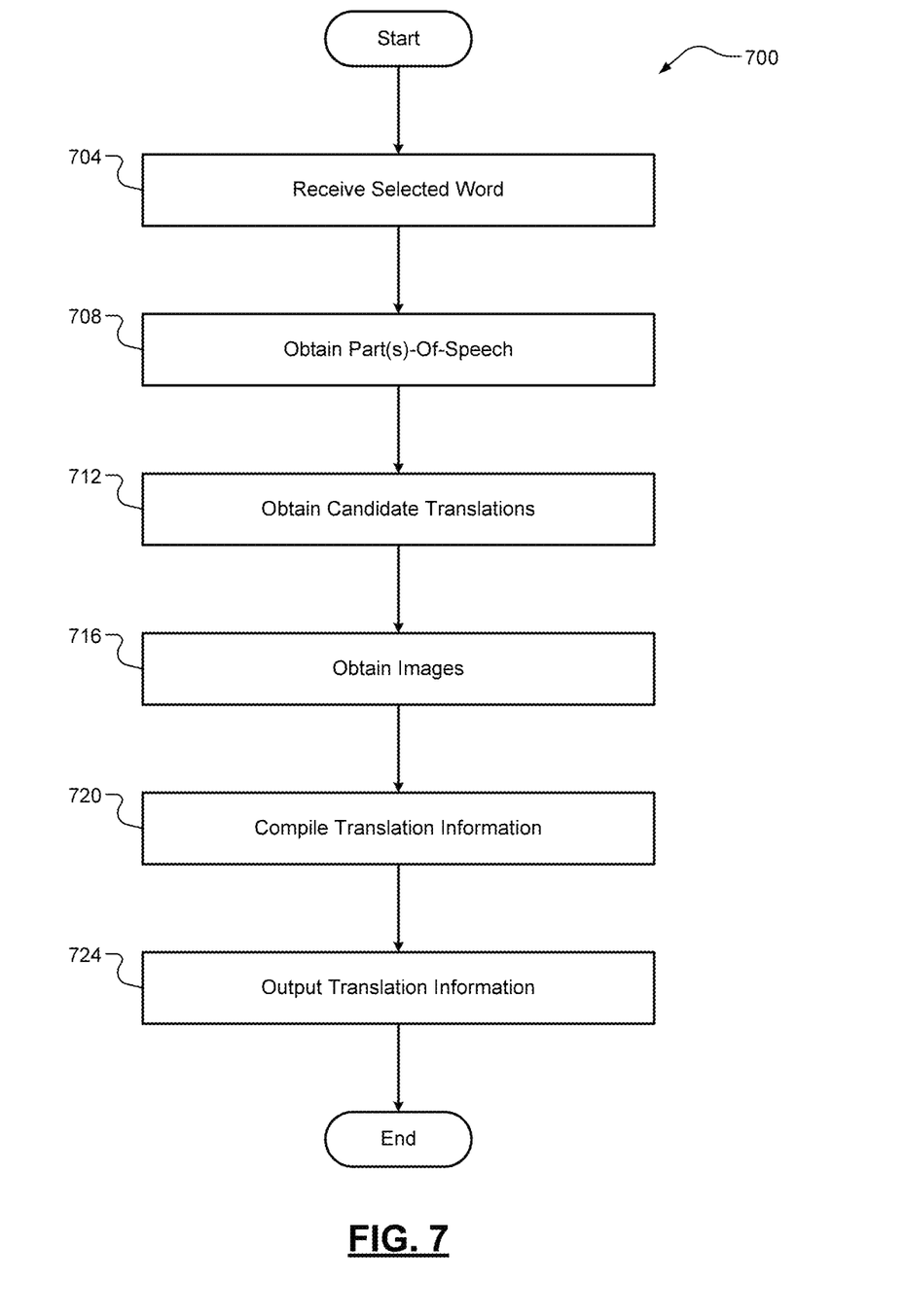
FIG. 7 is a flow diagram of an example technique for providing translation cards including contextually relevant definitions and examples according to some implementations of the present disclosure.

Referring now to FIG. 7, a flow diagram of an example technique 700 for providing visual translation cards including contextually relevant definitions and examples is illustrated. At 704, the server 104 can receive a selected word in a source language. At 708, the server can obtain one or more parts of speech for the selected word. At 712, the server 104 can, for each of the one or more parts-of-speech, obtain candidate translations of the selected word to a different target language, each candidate translation corresponding to a particular semantic meaning of the selected word. At 716, the server 104 can, for each semantic meaning of the selected word, obtain an image corresponding to the semantic meaning of the selected word. At 720, the server 104 can, for each semantic meaning of the selected word, compile translation information including (i) the semantic meaning, (ii) a corresponding part-of-speech, (iii) the image, and (iv) at least one corresponding candidate translation. At 724, the server 104 can output the translation information, e.g., to the computing device 108. The technique 700 can then end or return to 704.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
identifying, by a computing device having one or more processors, a word in a source language, the word having a plurality of different parts-of-speech associated therewith;
obtaining, by the computing device, candidate translations of the word to a different target language for each part-of-speech, each candidate translation corresponding to a different semantic meaning of the word;
generating, by the computing device, a translation card for each semantic meaning of the word, each translation card including translation information that includes: (i) the semantic meaning, (ii) a corresponding part-of-speech, (iii) at least one corresponding candidate translation, (iv) an image corresponding to the semantic meaning, and (v) an indicator of a frequency of occurrence of the semantic meaning; and
outputting, from the computing device, the translation cards, which causes another computing device to:
render, on a display, the translation information of a translation card, and a selectable icon configured to, upon its selection, render translation information of another translation card for a sub-meaning of the semantic meaning of the word.

2. The computer-implemented method of claim 1, wherein each translation card further includes a tree diagram comprising one or more related words to the identified word.

3. The computer-implemented method of claim 1, wherein identifying the word comprises receiving a selection input from a user from a document in the source language.

4. The computer-implemented method of claim 1, wherein the plurality of translation cards rendered on the display of the other computing device correspond to a same part-of-speech.

5. The computer-implemented method of claim 1, wherein the other translation card rendered on the display upon selection of the selectable icon corresponds to a second part-of-speech different than the first part-of-speech.

6. The computer-implemented method of claim 1, wherein the other translation card rendered on the display upon selection of the selectable icon corresponds to the first part-of-speech.

7. The computer-implemented method of claim 1, wherein each translation card further includes one or more semantic sub-meanings.

8. A computing system, comprising:
one or more processors; and
a non-transitory computer-readable storage medium having a plurality of instructions stored thereon, which, when executed by the one or more processors, cause the one or more processors to perform operations comprising:
identifying a word in a source language, the word having a plurality of different parts-of-speech associated therewith;
obtaining candidate translations of the word to a different target language for each part-of-speech, each candidate translation corresponding to a different semantic meaning of the word;
generating a translation card for each semantic meaning of the word, each translation card including translation information that includes: (i) the semantic meaning, (ii) a corresponding part-of-speech, (iii) at least one corresponding candidate translation, (iv) an image corresponding to the semantic meaning, and (v) an indicator of a frequency of occurrence of the semantic meaning; and
outputting the translation cards, which causes another computing device to:
render, on a display, the translation information of a translation card, and a selectable icon configured to, upon its selection, render translation information of another translation card for a sub-meaning of the semantic meaning of the word.

9. The computing system of claim 1, wherein each translation card further includes a tree diagram comprising one or more related words to the identified word.

10. The computing system of claim 8, wherein identifying the word comprises receiving a selection input from a user from a document in the source language.

11. The computing system of claim 8, wherein the plurality of translation cards rendered on the display of the other computing device correspond to a same part-of-speech.

12. The computing system of claim 8, wherein the other translation card rendered on the display upon selection of the selectable icon corresponds to a second part-of-speech different than the first part-of-speech.

13. The computing system of claim 8, wherein the other translation card rendered on the display upon selection of the selectable icon corresponds to the first part-of-speech.

14. The computing system of claim 8, wherein each translation card further includes one or more semantic sub-meanings.

15. A non-transitory computer-readable storage medium having a plurality of instructions stored thereon, which, when executed by one or more processors, cause the one or more processors to perform operations comprising:
identifying a word in a source language, the word having a plurality of different parts-of-speech associated therewith;
obtaining candidate translations of the word to a different target language for each part-of-speech, each candidate translation corresponding to a different semantic meaning of the word;
generating a translation card for each semantic meaning of the word, each translation card including translation information that includes: (i) the semantic meaning, (ii) a corresponding part-of-speech, (iii) at least one corresponding candidate translation, (iv) an image corresponding to the semantic meaning, and (v) an indicator of a frequency of occurrence of the semantic meaning; and
outputting the translation cards, which causes another computing device to:
render, on a display, the translation information of a translation card, and a selectable icon configured to, upon its selection, render translation information of another translation card for a sub-meaning of the semantic meaning of the word.

16. The computer-readable storage medium of claim 15, wherein each translation card further includes a tree diagram comprising one or more related words to the identified word.

17. The computer-readable storage medium of claim 15, wherein identifying the word comprises receiving a selection input from a user from a document in the source language.

18. The computer-readable storage medium of claim 15, wherein the plurality of translation cards rendered on the display of the other computing device correspond to a same part-of-speech.

19. The computer-readable storage medium of claim 15, wherein the other translation card rendered on the display upon selection of the selectable icon corresponds to a second part-of-speech different than the first part-of-speech.

20. The computer-readable storage medium of claim 15, wherein the other translation card rendered on the display upon selection of the selectable icon corresponds to the first part-of-speech.

\* \* \* \* \*